United States Patent [19]

Lindeman et al.

[11] Patent Number: 4,497,188
[45] Date of Patent: Feb. 5, 1985

[54] PROCESS AND APPARATUS FOR PEELING WIRE

[76] Inventors: Wolfgang Lindeman, Grosse Kurfurstenstrasse 15, D-4800 Bielefeld 1; Hans Lindeman, Zittauerstrasse 15, 4800 Bielefeld 1, both of Fed. Rep. of Germany

[21] Appl. No.: 451,969

[22] Filed: Dec. 21, 1982

[30] Foreign Application Priority Data

Dec. 22, 1981 [EP] European Pat. Off. ........ 81110696.2

[51] Int. Cl.³ .............................................. B21C 43/00
[52] U.S. Cl. ........................................ 72/40; 29/81 J; 72/67
[58] Field of Search ................... 29/81 A, 81 D, 81 F, 29/81 J, 81 R; 72/40, 67, 70, 71

[56] References Cited

U.S. PATENT DOCUMENTS 3,107,455 10/1963 Gloor et al. ......................... 198/625

FOREIGN PATENT DOCUMENTS 1707690 9/1955 Fed. Rep. of Germany .
959007 2/1957 Fed. Rep. of Germany .
1063008 8/1959 Fed. Rep. of Germany .
2328109 12/1974 Fed. Rep. of Germany .
3044174 9/1982 Fed. Rep. of Germany .

OTHER PUBLICATIONS

Draht 1972/10 Loopro-Anlagen zur kontinulerlichen Behandlung von Drahl, Author Von P. Heintz.

Primary Examiner—E. Michael Combs
Assistant Examiner—Charles Rosenberg
Attorney, Agent, or Firm—Bacon & Thomas

[57] ABSTRACT

A process and an apparatus for the peeling of wire wound into a coil and/or to be wound into a coil in a wire peeling machine. The wire is peeled bent in the form of a loop, with the individual wire loops having a curvature corresponding essentially to the curvature of the wire in the coil and the wire loops being separated so that the wire is being guided on a helically curving path. At least in one location a piece of a wire loop is spaced apart from two adjacent pieces of the adjacent loops so that a peeling head peeling a first loop piece may be accommodated between the two other loop pieces. In particular, the wire is guided helically on the circumferential surface of a partial annular torus or a cylinder. The wire may be peeled directly, i.e., without prior straightening. The axis of rotation of the peeling head is perpendicular to the plane formed by the curved axis of the coil, which also contains the axes of the disk or disks. The axis of rotation of the peeling head is horizontal. The peeling plane is located vertically above the axis of the coil.

23 Claims, 4 Drawing Figures

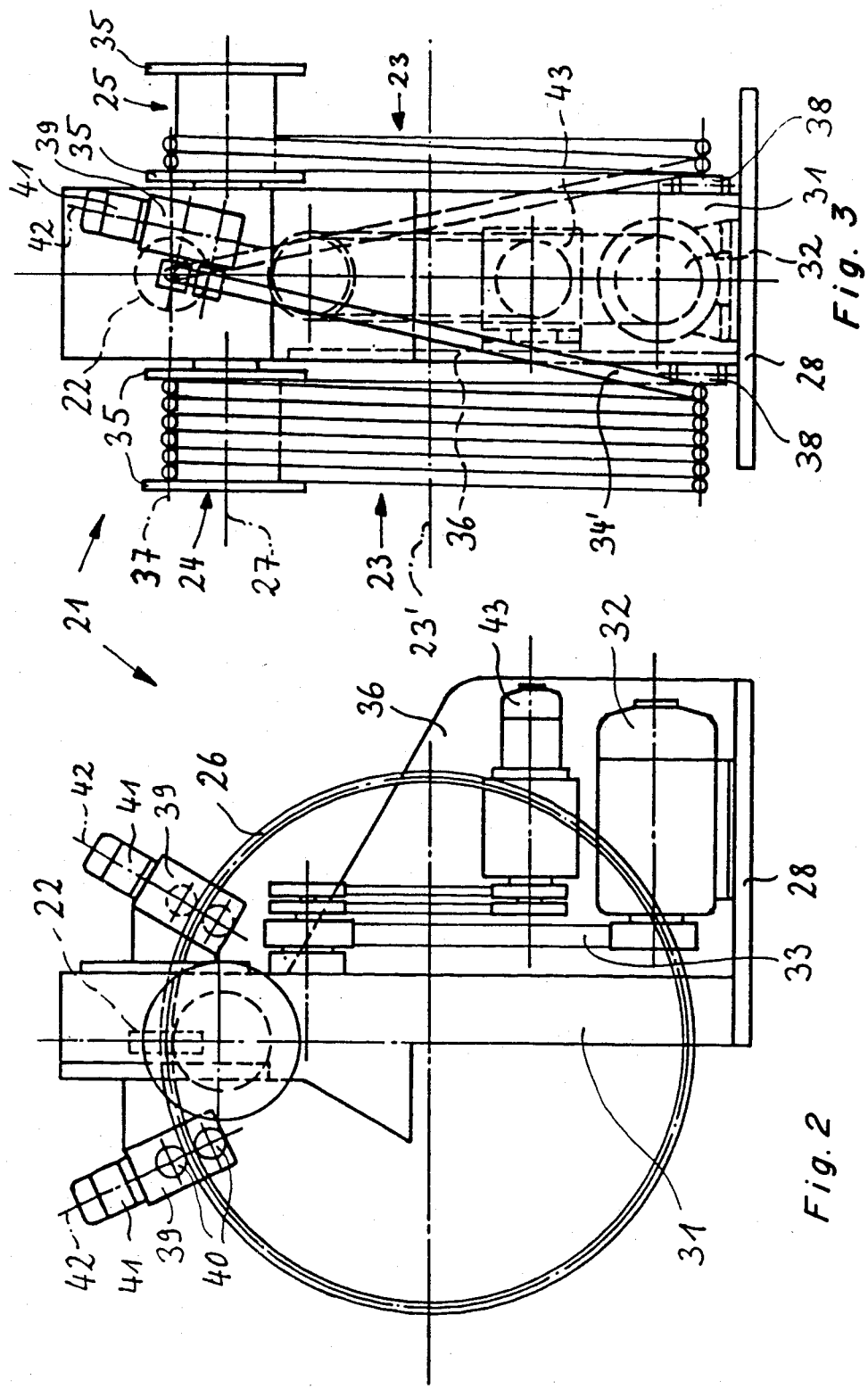

PROCESS AND APPARATUS FOR PEELING WIRE

BACKGROUND OF THE INVENTION

The invention concerns a process for the peeling of wire wound into a coil and/or to be wound into a coil, in a peeling installation and an apparatus for utilizing the process with a revolving peeling head, including a paying out device to hold a wire coil to be peeled and with a receiving device taking up the coil of peeled wire.

Numerous processes and devices are already known for the peeling of wire, especially wire coming from the rolling mill from which the roll scale is to be removed, in order to obtain a satisfactory wire surface.

Thus, it is known from DE (German Patent) No. 959 007 to unwind wire wound on a reel from said reel for further processing, straighten it in a straightening installation and then to peel the straightened wire in a peeling installation. After peeling, the wire is polished and then cut into pieces of predetermined lengths.

According to DE-GM (German Utility Patent) No. 1 707 690, the wire is paid out from a reel, straightened, peeled, polished, pre-bent and wound onto a second reel.

Similarly, in the process according to DE-AS (German Auslegeschrift No. 1 063 008), a similar sequence is followed, wherein the wire coming from the pay-out reel is guided around two reversing rolls and is then passed successively in the vertical direction through a straightening installation, a peeling head revolving around a vertical axle, a polishing installation and pre-bending device, followed by winding onto a second reel.

In all of the afore-described processes and installations, the wire is straightened prior to peeling, requiring not only extensive machinery but also much energy and time.

It has always been assumed heretofore that the wire must be straightened prior to machining.

This may also be derived from the more general processing of wire, for example the Loopro process (DRAHT 1972/10, pages 647 ff). In this Loopro process the wire is laid down in loops and, depending on the material, annealed, pickled, coated or the like. However, prior to exposing the wire coming from the rolling mill to these processing steps in the loop form, it is descaled. In order to descale or to draw the wire, the coiled wire is uncoiled, i.e., brought into a straight form and reshaped into a loop form after descaling or drawing, in order to be processed further. The descaling or drawing, i.e., the mechanical surface working, is here again effected only with the straightened wire.

The invention is based on the recognition derived from the peeling of rod materials that it is not necessary to straighten a material to be peeled, but that the material may be present in a bent form, if the curvature satisfies certain conditions, such as those described, for example, in DE-OS (German Offenlegungsschrift specification) No. 23 28 109. However, the afore-cited DE-OS No. 23 28 109 concerns the problem of the absorption of the torque applied to the material during peeling and solves the problem in that the material to be peeled is deformed at least over part of its cross section past its yield strength prior to the peeling area. This is attained in the known process in that the material to be processed is bent in a plane so that its axis may move on a stationary path of at least a quarter circle. After peeling, the material leaves the peeling area either in the straightened condition or the preselected curvature is maintained in the peeled material to the point where no torque is applied by the peeling process, whereupon the material is straightened.

The bending, guidance and re-bending of the material in this known installation requires a plurality of partially driven rollers or rolls.

SUMMARY OF THE INVENTION

It is therefore an object of the invention to provide a process of the aforementioned type and an apparatus for the embodiment of the process, wherein the wire may be peeled with reduced effort.

The object upon which the invention is based is attained by the process according to the invention in that the wire is peeled in the shape of loops and that the wire has a curvature during peeling corresponding essentially to the curvature of the wire in the coil. Depending on the diameter of the wire and the radius of curvature, the wire is deformed plastically to a greater or lesser extent or is present as a coil in a more or less deformed state. No straightening by means of a number of straightening rolls is necessary for the peeling process. Furthermore, the torque applied to the wire in peeling may be absorbed directly by the wire, thereby eliminating the anti-torsion devices which are applied with a great contact pressure against the wire and which are apt to leave running marks on the peeled wire. A large portion of the otherwise required guiding means may also be eliminated.

Depending on the form in which the wire to be peeled is present, or in what state the peeled wire is to be obtained, different processing steps must be effected.

Thus, it is possible to introduce the wire directly from the rolling mill, i.e., in essentially straight form, into the peeling machine, bend it therein and then wind it into a coil.

It is, however, also possible to straighten the wire after peeling and to cut it into predetermined, commercial lengths.

Preferably, however, the wire wound into a coil is peeled "in the coil" and then again laid down into a coil, whereby the curvature of the wire remains essentially constant during the entire process.

It is merely necessary to insure that the peeling head, when peeling a loop of wire, is at an adequate distance from the loop or both loops adjacent to it, i.e., that the individual wire loops are adequately isolated.

The simplest way to assure this consists of guiding the bent wire present in the form of a loop on a helical, curving path. According to one embodiment, this curved path leads over the circumferential surface of part of an annular torus, with the peeling action being performed in the area of the largest diameter of said torus. The coil is therefore pulled apart so that the axis of extended coil is curved and has a radius which preferably is slightly larger than the diameter of the coil. In the process, this curved axis passes over into the vertical axis or axes of a pay-out device and/or a receiving device, which preferably have the configuration of disks. These pay-out and receiving disks, which may correspond to known uncoiler and coiler disks, rotate around their vertical axles. If both an uncoiler and a coiler disk are present, they are rotating in opposing directions. The wire then passes over a helical path located on the circumferential surface of a semi-toroid.

Wire sections located on the external circumference of the torus are at the greatest distance from each other. The revolving peeling head is preferably arranged at the uppermost point of the path of the wire, with the wire being passed through said peeling head. Directly in front and immediately following the peeling head, additional guiding means may be provided for centering the wire loop to be peeled in the peeling head. It is the essential function of these guide means to hold and guide the wire loop passing through the peeling head in the plane in which the center of the peeling blades of the peeling head is located. The guide means thus essentially have a supporting function.

It is also possible, however, to guide the coiled wire helically around a straight axis, whereby the individual loops are removed from each other more and more and then, after the point wherein the revolving peeling head is located, the loops are brought closer and closer to each other. The uncoiling and/or the coiling units then consist advantageously of uncoiler and coiler shafts upon which the wire coil is resting. The axis of this screw may also be arranged vertically, with the wire being introduced on top, maintaining the necessary spacing for the acceptance of the peeling head between the individual loops by its own weight and being taken up at the bottom.

In a special form of embodiment, wherein the wire is guided on a helical curving path with a straight and horizontally arranged axle, an uncoiling shaft and a coiling shaft are arranged rotatingly on a horizontal axle, both shafts being arranged on either side of a support frame and bearingly supported on said frame with the uncoiling shaft spaced apart from the coiling shaft. The two shafts are driven rotatingly in the same direction. At any given time, only a single wire loop is present between the two shafts, which at its uppermost point passes through the peeling head, the latter being once again arranged in the support frame. The one loop in the center is spread apart by two rolls arranged on either sides of the base of the support frame, with the axles of said rolls being arranged vertically and the start and the end of the loop being attached to them, thereby providing space for the peeling head between the coils resting on the two shafts.

The fact that the wire is guided on a stationary, helical curved path is common to all of these forms of embodiment. Furthermore, the wire must be isolated in each instance so that at least in one location one piece of a loop of wire must be removed from two adjacent pieces of adjacent loops far enough so that a peeling head peeling the first piece of a loop may be placed between two other pieces of loops. The axis of rotation of the peeling head and the coil axis must have a common normal and the two axes are at a distance of one half coil diameter from each other.

In the forms of embodiment wherein the wire is either introduced in the straight form or removed in this form, the wire is present only in a partial range in the corresponding loop shape. This partial range is, however, extending past the peeling area into the side of the straight wire. This in turn signifies that the straight introductory or output part of the wire includes an angle with the axis of the peeling head between 10° and 30°, and preferably between 10° to 15°. Within the immediate area of the peeling action, all of these forms of embodiment must maintain the same conditions.

According to one form of embodiment of the invention, the axis of the wire coil is further located in the peeling plane of the peeling head.

In order to be able to guide the wire always over the same path, thereby relieving the stress on the guiding means, the uncoiling and/or the coiling disks are adjustable in height, preferably automatically, which may be accomplished for example having each disk pressured upwards by a spring with said springs being compressed to a greater or lesser extent by the amount of wire present.

Preferably, directly in front and/or after the peeling head, feeder devices are provided, which may consist, for example, of the guides in the form of driven feeder rolls or of bending devices again in the form of driven feeder rolls.

BRIEF DESCRIPTION OF THE DRAWINGS

Further characteristics and advantages of the invention will become apparent from the examples of embodiment explained in conjunction with the drawing. In the drawing:

FIG. 2 is a lateral elevation in a schematic representation of a wire peeling machine according to a further form of embodiment in which a coiled wire is taken from an uncoiler shaft, peeled in the loop form and taken up by a coiler shaft; and, FIG. 3 is a front elevation of the wire peeling machine according to FIG. 2.

Figure 1:
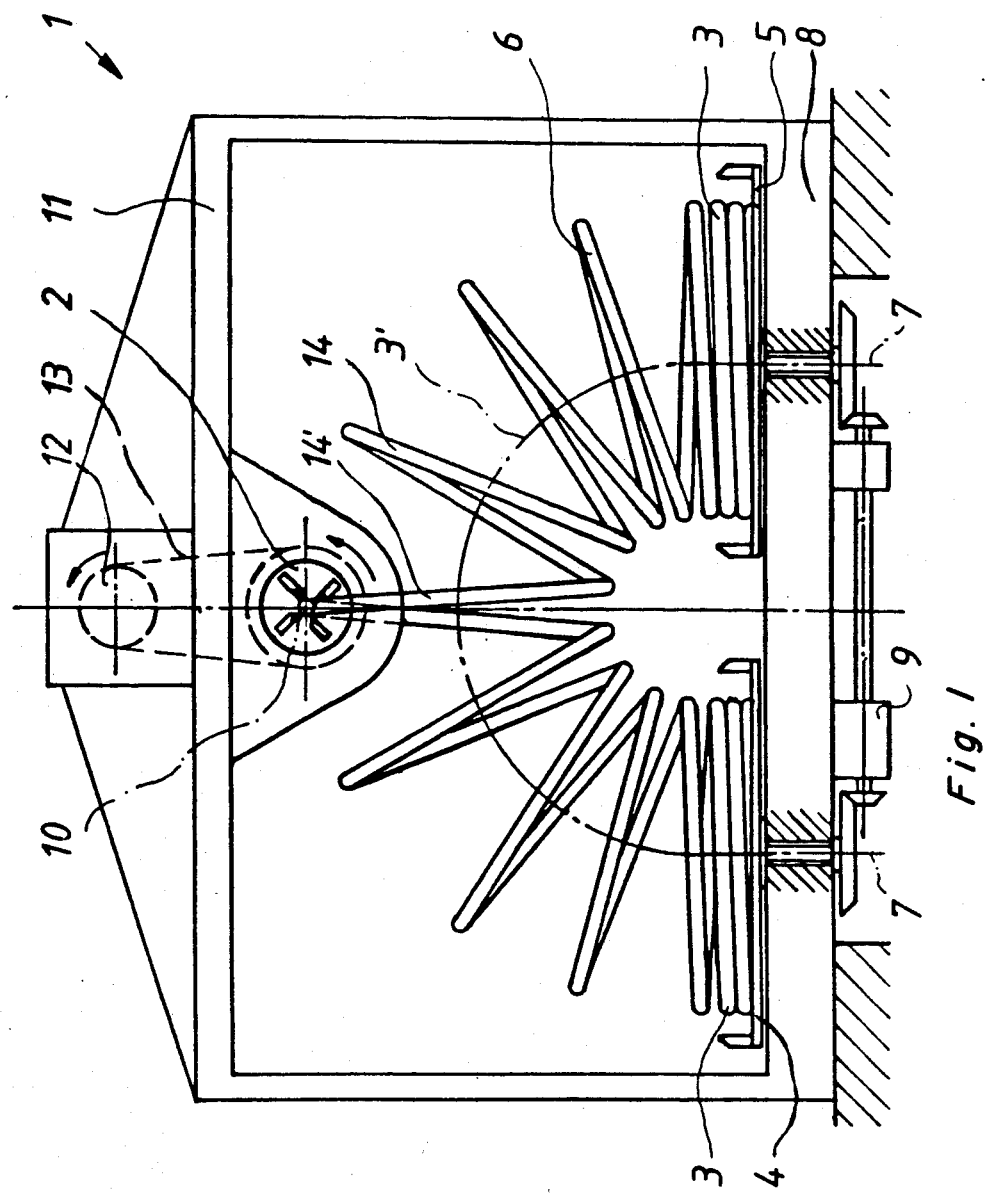
FIG. 1 shows a schematic view of the wire peeling machine, wherein coiled wire is taken from an uncoiling disk, peeled in the loop form and placed upon a coiler disk.

A wire peeling machine 1 according to FIG. 1 essentially consists of a driven peeling head 2, a payout disk 4 taking up the wire coil 3 to be peeled and a coiler disk 5 taking up the peeled wire 3.

The payout disk 4 and the coiler disk 5 are similiar to the known uncoiling and coiling disks, even though here the wire 6 is neither uncoiled or coiled in the proper sense. The axes 7 of the payout and coiler disks 4 and 5 are here located in a vertical plane—in this case in the plane of the drawing—and are at a distance from each other corresponding approximately to 1.25 times the external diameter of either disk 4 or 5. Coils of wire with an outer diameter of 1000 to 2000 mm may be placed in this instance on the disks 4 and 5. Both of the disks 4 and 5 are placed here on a common machine foundation 8 in a rotating manner and may be driven by a drive motor 9 common to both disks 4 and 5 in opposing directions of rotation.

In the plane of the axes of rotation of the disks 4 and 5 and in the center between them and at a distance approximately 1.5 times the coil diameter from them, the revolving peeling head 2 is arranged so that its axis of rotation 10 is approximately perpendicular to the aforementioned plane of the disk axes 7. The peeler head 2 is rotatingly supported in a support frame 11 with said support frame 11 being joined to the machine foundation 8.

Above the peeling head 2, a drive motor 12 for the peeling head 2 is arranged, said motor being actively connected as shown in the drawing by means of an inverted tooth type chain or drive belt. However, another type of drive may also be chosen, such as that described in DE-OS No. 30 44 174 by the same inventors, i.e., the peeling head comprised essentially of a flange having an external toothed gear wheel arranged on its outer circumference, said toothed wheel engaging two or more drive gears distributed over the circumference and connected with a drive motor each. One of the drive motors is then located vertically under the peeling head 2 in the void of the helically guided wire coil 3, the configuration whereof shall be described in more detail hereinbelow.

The wire 6 taken from the payout disk 4 in the form of a loop is moving on its way to the takeup disk 5 helically on the generating curve of one half of an annular torus, with the individual wire sections always moving on the same helical curve and the axis of the helices being bent in a semicircular manner. Consequently, the individual loops 14 of the wire 6 are spaced apart on the outer circumference of the path much farther than on the inner circumference of said path. The distance of the loops 14 from each other on the external circumference is determined essentially by the dimensions of the peeling head 2, including its drive gear, i.e., the distance of the loops 14 on the external circumference must be larger than one half of the width in the plane of the drawing of the peeling head 2 and possibly its drive 12. However, as the result of the circular bend of the coil axis 3' in this areas, the average distance of the loops 14 from each other may be chosen smaller than if the coil would be drawn apart, in a straight axis, in order to peel the wire 6.

Guides located in front and behind the plane of the drawing according to FIG. 1, are not shown. These guides have the function of centering the wire 6 in the peeling head 2, so that the wire will be peeled uniformly around its longitudinal axis. Even though the bent wire 6 is occupying a definite position, it was determined experimentally that while the wire is not straightened prior to peeling, it is still necessary to center the wire 6, i.e., the intermediate wire loop 14' directly in front and immediately after the peeling head. The torque applied to the wire in the peeling process is absorbed by the bent wire and therefore the guides are additionally performing a supporting function, however, compared with the known wire peeling machines, this requires a greatly reduced mechanical effort to obtain optimum peeling results.

Because of the stiffness of the wound wire 6 and the always identical motion of the wire on an accurately determined curve, these guiding means are sufficient in themselves. Further guiding means may, however, be provided within the area of the wire 14' immediately prior to peeling or directly after peeling, said additional guiding means carrying the wire 6 over approximately one fourth of a circle before and one fourth of a circle behind the peeling area.

If the wire is introduced or removed in the straight condition, bending installations, not yet shown, are necessary in front or behind the plane of the drawing, said bending installations consisting for example of three rolls arranged in succession as viewed in the direction of the feed of the wire, alternatingly on opposite sides of the wire, with the center roll being located inside the wire loop 14' and the two outer rolls outside the wire loop 14'.

One or several of the guide rolls and/or of the bending rolls are driven feed rolls.

The uncoiler and coiler disks 4 and 5 are automatically adjustable in height (not shown) so that the first loop 14 is leaving the laid down coil 3 always at the same height, while the last free loop 14 is being laid on the coil 3 of the takeup disk 5 always at the same height. In this manner, a spatially identical configuration of the curved path is assured for the entire coil 3. This may be obtained for example by that the uncoiler and coiler disks 4 and 5 are each pressured upward by a spring, compressed by the weight of the coil 3 resting upon them, said weight being variable in time.

In the wire peeling machine 21 according to FIG. 2 and 3, the wire 26 wound into a coil 23 is again peeled in the form of a loop in the peeling head 22. In the process, the coil 23 is moved so that its axis 23' is aligned horizontally during the introduction, the peeling action and the removal, i.e., the wire 26 moves on a helically curving path having a straight axis 23'.

For peeling, the coil 23 is placed on a payout shaft 24, having a holding flange 35 on each of its axial ends. After peeling, the coil 23 is taken up by an uptake shaft 25 having a symmetrical configuration, with the symmetry axis being arranged in the axle of rotation of the peeling head 22. The axis 23' of the coil 23 thus remains straight in contrast to the aforedescribed form of embodiment, i.e., the wire moves on a helically curving path with a straight axis. The diameter of the two shafts 24 and 25 corresponds to approximately one fifth of the diameter of the coil 23, while the axial length of the individual shaft 24 or 25 and thus the distance between two holding flanges 35 here corresponds approximately to the diameter of the shafts. However, the axial length of the shafts 24 and 25 may be larger; a person skilled in the art will adjust this length in keeping with the dimensions of the coil 23 resting on the shafts. The same is true for the diameter of the holding flange 35, which should be dimensioned so that even the uppermost wire layer—for the sake of clarity only one layer is shown in the drawing—is secured against axial displacement. The payout shaft 24 and the coiler shaft 25, driven by a drive motor, not shown, are revolving in the same direction of rotation, in FIG. 2 in the clockwise direction, so that the individual loops of the coil 23 are similarly moved on the helically curving path in the clockwise direction (FIG. 2).

The shafts 24 and 25 may have a configuration similar to the payout shaft of the apparatus according to U.S. Pat. No. 3,107,455, wherein by means of an apparatus described in the reference, individual loops of a wire coil are cleaned by blasting with a grinding medium.

Between the two shafts 24 and 25, here on a machine foundation 28, a support frame 31 is provided for the peeling head 22, said support frame also carrying the two shafts 24 and 25 and being held by a supporting plate 36.

The peeling head 22 is arranged in a plane including the axes of the payout and takeup shafts 24 and 25 and the axis 23' of the coil, while the axis of rotation of the peeling head 22 is perpendicular to this plane and is arranged centered between the payout shaft 24 and the takeup shaft 25 and at the height of the wire sections (axis 37) resting on the shafts 24 and 25. The helically curving path upon which the wire 26 is moving, thus has the same diameter everywhere, said diameter corresponding to the diameter of the coil 23.

Between the two shafts 24 and 25, in this form of embodiment of the wire peeling machine 21 only a single wire loop 34' is located. In the uppermost point of this wire loop 34', the latter passes through the peeling head 22, which for example may again have the configuration according to DE-OS No. 3 044 174, previously cited. The lower ends of this intermediate wire loop 34', the only one not resting on the shafts 24 and 25, are located underneath the inner ends of the shafts 24 and 25 and are passing over there into the following wire loop 34 of the coil 23 resting on the shaft 24 or 25. In order to prevent the grinding of the wire 26 on the support frame 31, in this transition area from the intermediate wire loop 34' to the two adjacent wire loops 34, freely rotating rolls 38 (FIG. 3) are provided, upon which the wire 26 is resting, with said rolls being rotated by the wire 26. The rolls 38 thus serve to spread the intermediate wire loop 34' in the direction of their axis 23'.

In the form of embodiment according to FIG. 2 and 3, for the wire 26 in front and after the peeling head 22, the feed and guide installations 39 are additionally provided, each installation consisting here of two rolls 40 each, placed in opposition to each other, with the wire loop 34' being guided between them. The rolls 40 are driven by their own motor 41. The feed and guide installations 39 are immobilized with respect to the support frame 31, with the axes 42 of these installations 39 being inclined with respect to the vertical so that the axis 42 is always aligned parallel to the plane defined by the wire section being guided and is passing through the axis 23' of the coil 23.

FIG. 2 and 3 further disclose a control motor 43, positioned vertically with respect to drive motor 32 for controlling the peeling head 22, whereby the radial displacement of the peeling blades of the peeling head 22 may be effected by the generation of a differential rpm with respect to the rpm of the peeling head 22, in a known manner.

Figure 4:
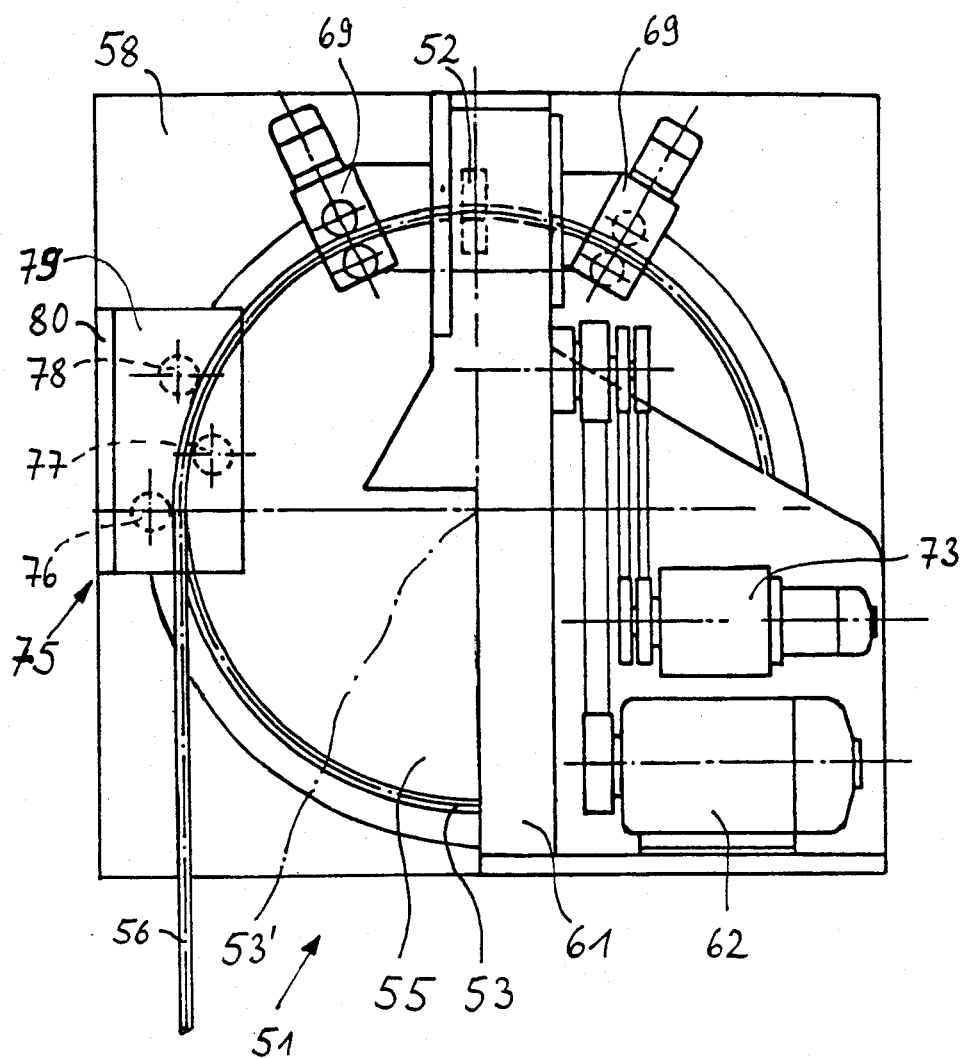
FIG. 4 is a schematic top view of a wire peeling machine according to a third form of embodiment.

FIG. 4 shows a wire peeling machine 51 wherein the wire 56 is introduced in the straight condition. The wire 56 is bended by a bending installation 75, this bending installation 75 consisting of three rolls 76, 77 and 78 arranged in succession as viewed in the direction to the feed of the wire 56, alternatingly on opposite sides of the wire, with the center roll 77 being located inside the wire loop 64' and the two outer rolls 76 and 78 outside the wire loop 64'. These rolls 76, 77 and 78 are arranged in a housing 79 which is mounted on a support frame 80 standing on a machine foundation 58. On this machine foundation 58 there is further provided the support frame 61. The peeling head 52, two feed and guide installations 69, the drive motor 62 and the control motor 73 are mounted on the support frame 61 similar to the embodiment according to FIG. 2. A coiler disk 55, similar the coiler disk 5 of FIG. 1 takes up the bended and peeled wire coil 3 and is mounted rotable on the machine foundation 58.

In the embodiment of FIG. 4 the wire 56 after the bending moves on a helically curving path having a straight and vertical axis 53'.

With the aforedescribed wire peeling machines 1, 21 and 51 wire coils 3, 23 and 53 weighting 1 to 2 tons and having a wire diameter of up to 35 mm, may be peeled satisfactorily and without an extensive machinery investment.

What is claimed is:

1. An apparatus for the peeling of wire, said wire being in the shape of a loop when being peeled, comprising:
    (a) a revolving peeling head;
    (b) a rotatable payout means for feeing wire in coil form rotated on said payout means to said peeling head;
    (c) a rotatable takeup device which receives said coiled wire from said peeling head, wherein the axes of said payout means, said takeup device and said wire loop are in the plane of said revolving peeling head.

2. An apparatus for the peeling of wire, said wire being in the shape of a loop and being peeled when in the shape of a loop, comprising:
    (a) a revolving peeling head;
    (b) a rotatable payout device which feeds said wire to said peeling head in the shape of a loop; and
    (c) a rotatable takeup device which receives said wire from said peeling head in the form of a loop.

3. An apparatus according to claim 2, characterized in that the axis of rotation of the peeling head and the axis of the wire loop engaged with said peeling head have a common normal.

4. An apparatus according to claim 2, characterized in that the axis of the peeling head is spaced apart from the axis of the wire loop engaged with said peeling head by one half of the loop diameter.

5. An apparatus according to claim 2, characterized in that a machine foundation accommodates a support frame and the peeling head and the peeling head drive located on said support frame.

6. An apparatus according to claim 5, characterized in that immediately in front and immediately after the peeling head, guide devices, adjustable in their diameter and their position and in particular capable of being immobilized in the support frame, are provided for the wire loop both prior to and subsequent to engagement of the wire loop with said peeling head.

7. An apparatus according to claim 6, characterized in that the guide devices center the wire loop in the peeling head, said guide devices adjust to different size wire and are fastened to said support frame.

8. An apparatus according to claim 7, characterized in that feeder devices are provided before and after the peeling head for feeding the wire, said feeder devices act on the wire loop as the wire loop passes through the peeling head.

9. An apparatus according to claim 8, characterized in that the guide devices and feeder devices are unitary.

10. An apparatus according to claim 2, characterized in that devices to bend the wire are arranged on either side of said peeling head.

11. An apparatus according to claim 2, characterized in that the axis of the wire loops is bent at least a quarter of a circle and intersects with the axes of the payout and takeup devices wherein the payout and takeup devices have the configuration of a disk.

12. An apparatus according to claim 11, characterized in that the axes of the payout disk and of the takeup disk are arranged parallel to and spaced apart from each other.

13. An apparatus according to claim 12, characterized in that the distance of the axes of the payout disk and the takeup disk are approximately 1.5 times the diameter of the disks.

14. An apparatus according to claim 12, characterized in that the payout disk and the takeup disk are driven synchronously in opposing directions of rotation.

15. An apparatus according to claim 12, characterized in that the axis of the peeling head is substantially perpendicular to the plane formed by the axis of the wire loop.

16. An apparatus according to claim 15, characterized in that the payout disk and the takeup disk are supported in bearings on the machine foundation, said foundation also supporting a drive motor which drives said disks.

17. An apparatus according to claim 2, characterized in that the axis of each individual wire loop which constitute an entire coil of said wire is aligned in a straight line.

18. An apparatus according to claim 17, characterized in that the axis is aligned horizontally.

19. An apparatus according to claim 17, characterized in that a single wire loop is located between the payout device and the takeup device.

20. An apparatus according to claim 19, characterized in that the payout device and the takeup device are shafts.

21. An apparatus according to claim 20, characterized in that the shafts have a diameter and a length corresponding approximately to one-fifth of the coil diameter and the axial ends of the shafts are provided with flanges, said flanges protruding past the diameter of the shafts.

22. An apparatus according to claim 21, characterized in that the shafts are supported in bearings on the support frame and are driven by means of a drive motor.

23. An apparatus according to claim 22, characterized in that roller elements are positioned on two sides of the support frame and in contact with wire coils, said roller elements spread apart the wire loop, in an axial direction, as said wire loop engages said peeling head.

* * * * *